United States Patent
Cretella (12)

(10) Patent No.: US 11,121,531 B2
(45) Date of Patent: Sep. 14, 2021

(54) CABLE TRAY SPLICE

(71) Applicant: Hubbell Incorporated, Shelton, CT (US)

(72) Inventor: Joseph Nicholas Cretella, Ansonia, CT (US)

(73) Assignee: Hubbell Incorporated, Shelton, CT (US)

( * ) Notice: Subject to any disclaimer, the term of this patent is extended or adjusted under 35 U.S.C. 154(b) by 220 days.

(21) Appl. No.: 16/082,050

(22) PCT Filed: Mar. 2, 2017

(86) PCT No.: PCT/US2017/020453
§ 371 (c)(1),
(2) Date: Sep. 4, 2018

(87) PCT Pub. No.: WO2017/151924
PCT Pub. Date: Sep. 8, 2017

(65) Prior Publication Data
US 2020/0244055 A1    Jul. 30, 2020

Related U.S. Application Data

(60) Provisional application No. 62/303,657, filed on Mar. 4, 2016.

(51) Int. Cl.
*H02G 3/04*    (2006.01)
*H02G 3/06*    (2006.01)
(Continued)

(52) U.S. Cl.
CPC ......... *H02G 3/0608* (2013.01); *H02G 3/0437* (2013.01); *F16L 3/222* (2013.01);
(Continued)

(58) Field of Classification Search
CPC ....... H02G 3/0608; H02G 3/0443; F16L 3/22; F16L 3/2235; F16B 2/08
See application file for complete search history.

(56) References Cited

U.S. PATENT DOCUMENTS

| | | | | |
|---|---|---|---|---|
| 3,526,934 A | * | 9/1970 | Owen, Sr. .............. | F16L 3/2235 285/154.1 |
| 4,192,965 A | * | 3/1980 | Baum ...................... | H02G 3/10 174/135 |

(Continued)

OTHER PUBLICATIONS

PCT/US2017/020453 International Search Report and Written Opinion dated May 19, 2017 (14 pages).

*Primary Examiner* — Tan Le
(74) *Attorney, Agent, or Firm* — Michael Best & Friedrich LLP

(57) ABSTRACT

A splice for connecting a first and second cable tray includes first and second connectors. The first connector has a first base, a first tine extending from the first base having a first female connecting feature, and a second tine extend from the first base having a first male connecting feature. The first and second tine are separated by a first opening. The second connector has a second base, a third tine extending from the second base having a second female connecting feature, and a fourth tine extend from the second base having a second male connecting feature. The third tine and the fourth tine are separated by a second opening. The first and second connectors are configured to be connected together with the first female connecting feature mating with the second male connecting feature and the first male connecting feature mating with the second female connecting feature.

20 Claims, 3 Drawing Sheets

(51) Int. Cl.
*H02G 7/00* (2006.01)
*F16L 3/22* (2006.01)
*H02G 3/00* (2006.01)
*F16L 3/23* (2006.01)

(52) U.S. Cl.
CPC .............. *F16L 3/23* (2013.01); *H02G 3/0443* (2013.01); *H02G 3/0456* (2013.01); *H02G 3/26* (2013.01)

(56) References Cited

U.S. PATENT DOCUMENTS

| | | | | |
|---|---|---|---|---|
| 4,344,480 A * | 8/1982 | Boyer | .................. | F28F 9/0135 165/162 |
| 6,061,884 A * | 5/2000 | Ohms | .................. | H02G 3/0443 24/545 |
| 6,398,594 B1 * | 6/2002 | Bonilla | ................ | H01R 13/506 439/107 |
| 6,471,171 B1 * | 10/2002 | VanderVelde | ............ | H02G 3/32 248/229.12 |
| 8,684,319 B2 * | 4/2014 | Brouwer | .............. | H02G 3/0443 248/49 |
| 8,708,289 B2 * | 4/2014 | Allenbach | ............. | F16L 3/2235 248/68.1 |
| 8,757,559 B2 * | 6/2014 | Davis | ................... | H02G 3/0443 248/49 |
| 8,776,469 B2 * | 7/2014 | Morey | .................. | F16B 7/0493 52/506.06 |
| 9,178,343 B2 * | 11/2015 | Brouwer | .............. | H02G 3/0443 |
| 9,869,331 B2 * | 1/2018 | Muntasser | ................ | F16B 2/08 |
| 2003/0108385 A1 | 6/2003 | Finco et al. | | |
| 2008/0017908 A1 | 7/2008 | Deciry | | |
| 2010/0260463 A1 * | 10/2010 | Pollard, Jr. | .......... | G02B 6/4459 385/135 |
| 2011/0284702 A1 | 11/2011 | Davis et al. | | |
| 2015/0078809 A1 | 3/2015 | Winn | | |

* cited by examiner

CABLE TRAY SPLICE

RELATED APPLICATION(S)

This application is based on U.S. provisional application Ser. No. 62/303,657, filed Mar. 4, 2016, the disclosure of which is incorporated herein by reference in its entirety and to which priority is claimed.

FIELD

Various exemplary embodiments of the invention relate to cable trays and connecting devices for cable tray systems.

BACKGROUND

Commercial and utility installations, including factories, power plants and other buildings, can require a large amount of interior power and data distribution. This can result is complex networks of cables and other conduits routed through rooms, multiple areas, or an entire structure. Cable tray systems and methods have been developed to help manage cable distribution in an efficient and flexible manner.

Cable tray systems can include trays that typically have a bottom wall and a pair of side walls defining a trough for receiving cables. The bottom and sides can be made from solid sheets without openings or made from a mesh of intersecting rods. Different sizes, shapes, and configurations of trays can be used in a single system to provide support as needed over a variety of different areas. The trays can be connected to walls, floors, subfloors, and each other for support.

Connecting two cable trays together typical requires a separate connectors or coupling member. Connectors can be integrally formed or attached to one or more ends of a cable tray. Connectors are also sold as separate accessories, and require the use of specialized tools to attach them to the cable tray.

SUMMARY

According to an exemplary embodiment, a splice for connecting a first cable tray and a second cable tray includes a first connector and a second connector. The first connector has a first base, a first tine extending from the first base having a first female connecting feature, and a second tine extending from the first base having a first male connecting feature. The first tine and the second tine are separated by a first opening. The second connector has a second base, a third tine extending from the second base having a second female connecting feature, and a fourth tine extending from the second base having a second male connecting feature. The third tine and the fourth tine are separated by a second opening. The first and second connectors are configured to be connected together with the first female connecting feature mating with the second male connecting feature and the first male connecting feature mating with the second female connecting feature.

According to another exemplary embodiment, a splice for connecting a first cable tray and a second cable tray includes a base. A first tine extends from the base and has a first male connecting feature. A second tine extends from the base opposite the first tine and has a second male connecting feature. A third tine extends from the base positioned between the first tine and the second tine and has a first female connecting feature. A fourth tine extends from the base opposite the third tine and has a second female connecting feature.

According to another exemplary embodiment, a cable tray system includes a first cable tray, a second cable tray, a first connector, and a second connector. The first connector has a first base, a first tine extending from the first base having a first female connecting feature, and a second tine extending from the first base having a first male connecting feature. The first tine and the second tine are separated by a first opening. The second connector has a second base, a third tine extending from the second base having a second female connecting feature, and a fourth tine extending from the second base having a second male connecting feature. The third tine and the fourth tine are separated by a second opening. The first connector is connected to the second connector and a portion of the first cable tray and a portion of the second cable tray are positioned between the first connector and the second connector.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
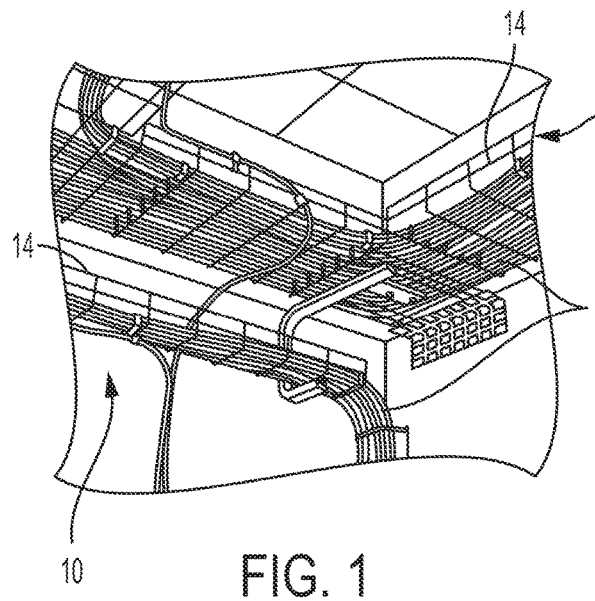
FIG. 1 is a bottom perspective view of a cable tray system and cables.
Figure 2:
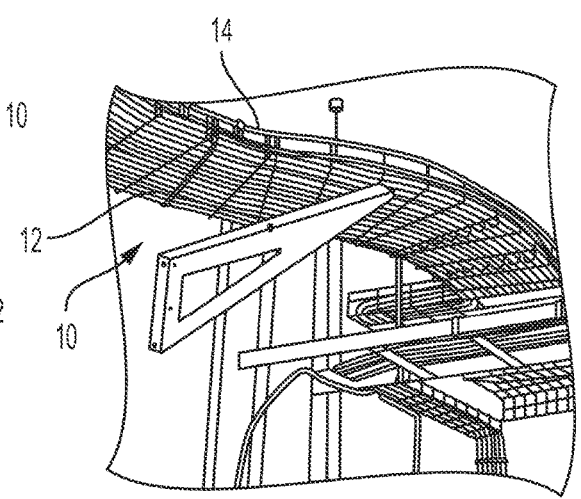
FIG. 2 is a bottom perspective view of another cable tray system and cables.
Figure 3:
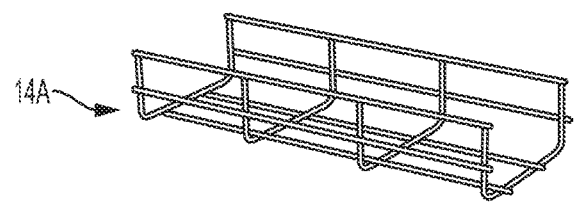
FIG. 3 is a perspective view of an exemplary cable tray.
Figure 4:
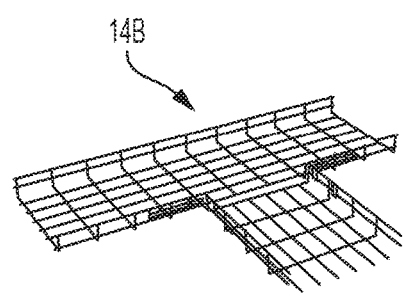
FIG. 4 is a perspective view of another exemplary cable tray.
Figure 5:
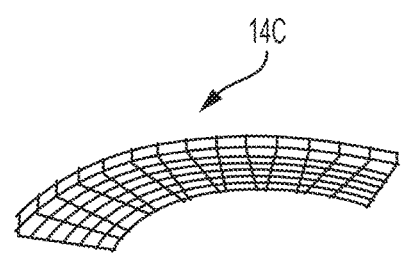
FIG. 5 is a perspective view of another exemplary cable tray.
Figure 6:
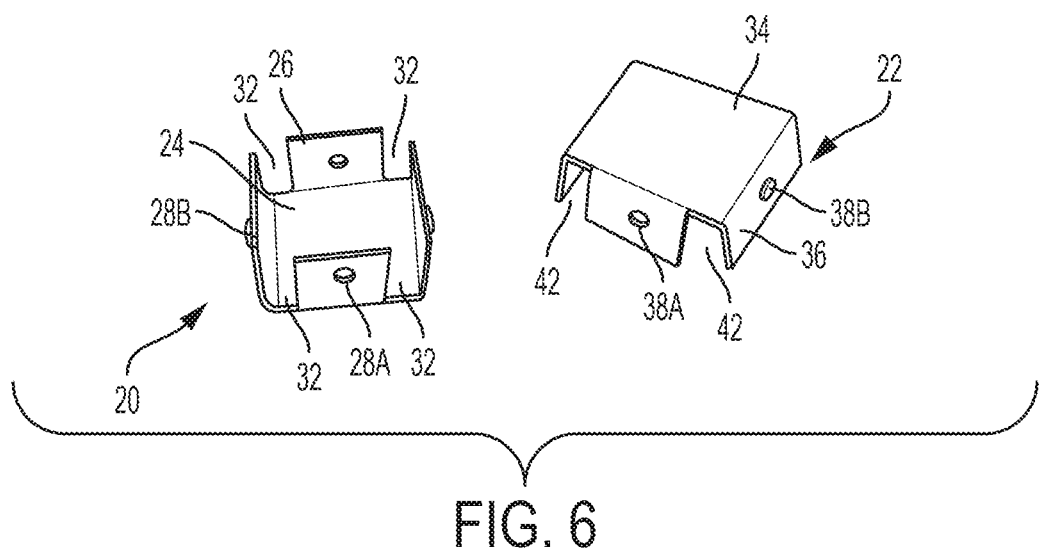
FIG. 6 is a perspective view of an exemplary first connector and second connector for a cable splice.
Figure 7:
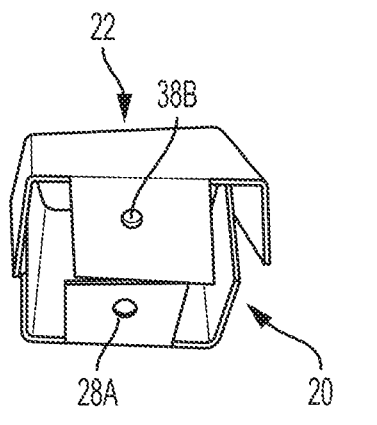
FIG. 7 is a top perspective view of the first connector partially connected to the second connector.
Figure 8:
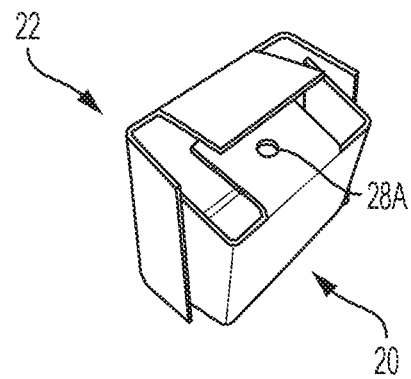
FIG. 8 is a side perspective view of FIG. 7.
Figure 9:
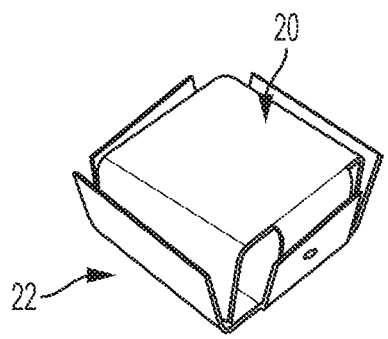
FIG. 9 is a bottom perspective view of FIG. 7.

Various exemplary embodiments are directed to connectors or splices for cable tray systems 10. Cable tray systems 10 are used to support runs of electrical cables 12 with as shown in FIGS. 1 and 2. Cable tray systems 10 include multiple cable trays 14 connected to each other, with one or more of the cable trays supported, for example on a wall, by mounting hardware. The cable trays 14 can have a wire mesh configuration with longitudinally extending wires and laterally extending wires connected, for example through a joining process such as spot welding. Cable trays 14 can have a variety of configurations. For example, FIG. 3 shows a straight cable tray 14A, FIG. 4 shows a T-configuration cable tray 14B, and FIG. 5 shows a 90° sweep configuration cable tray 14C. Other cable tray configurations are possible. Because the size and shape of environments can differ substantially, installation flexibility and ease is important when creating and installing cable tray systems 10. Therefore, multiple cable trays can be connected adjacent to one another in different orientations to support cables 12 along different environments.

FIGS. 6-9 show an exemplary embodiment of a splice used to connect adjacent cable trays. The splice is a two-piece kit having a first connector 20 and a second connector 22. The connectors 20, 22 are made from metal and can provide a grounding path along the cable tray, although other suitable materials and alternative grounding connections can also be utilized.

The first connector 20 includes a base 24 and one or more tines 26 extending from the base. The base 24 has a rectilinear configuration with four rectilinear tines 26, although other sizes, shapes, and configurations can be used. The tines 26 extend from the base 24 to surround an interior. One or more tines 26 include a first connecting feature 28A and one or more tines 26 include a second connecting feature 28B. In an exemplary embodiment, the first connecting feature 28A includes a female connecting feature and the second connecting feature 28B includes a male connecting feature, and the first and second connecting features 28A, 28B are on alternating tines 26. The first female connecting feature can take the form of an opening, cavity, depression, recess, opening, or other mating structure. The first male connecting feature can take the form of a projection such as a dimple or other mating structure. The tines 26 are separated by openings 32. Other sizes, shapes, and configurations of the base or tines can also be used for the first connector 20.

The second connector 22 includes a base 34 and one or more tines 36 extending from the base 34. The base 34 has a rectilinear configuration with four rectilinear tines 36, although other sizes, shapes, and configurations can be used. The tines 36 extend from the base 34 to surround an interior. One or more tines 36 include a first connecting feature 38A and one or more tines 36 include a second connecting feature 38B. In an exemplary embodiment the first connecting feature 38A includes a female connecting feature and the second connecting feature 38B includes a male connecting feature, and the first and second connecting features 38A, 38B are on alternating tines 36. The tines 36 are separated by openings 42. Other sizes, shapes, and configurations of the base 34 or tines 36 can also be used for the second connector 22.

The male connecting features 28A, 38A and female connecting features 28B, 38B can be facing the interior of the connector 20, 22, the exterior of the connector 20, 22, both the interior and exterior, or alternating. In certain embodiment, a single tine can include both a male and female connecting feature.

In various exemplary embodiments, the first and second connector 20, 22 have similar or identical first connecting features 28A, 38A and second connecting features 28B, 38B. Accordingly, the first and second connector 20, 22 can be identical, which can reduce the complexity of the connector, easing manufacturing and storage costs. In alternative embodiments, the first connector 20 has only first connecting features 28A and the second connector 22 has only second connecting features 38B. Different types of connecting features as well as more or less connecting features can also be used. For example, a first connecting feature 28A, 38A formed on a first side of the tine 26, 36 and a second connecting feature 28B, 38B formed on the second side of the tine 26.

Figure 10:
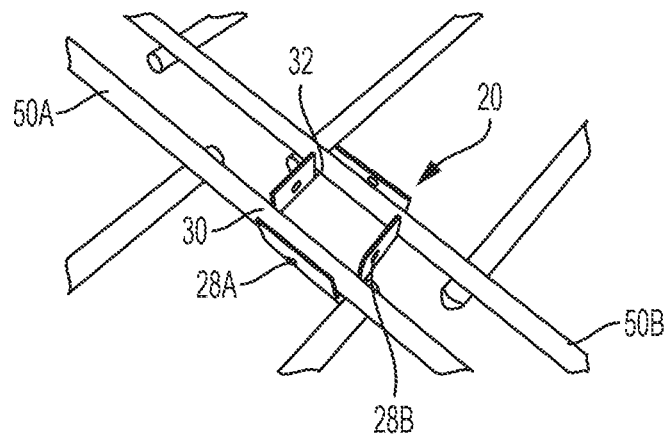
FIG. 10 is a top perspective view of a first connector and a first and second cable tray.
Figure 11:
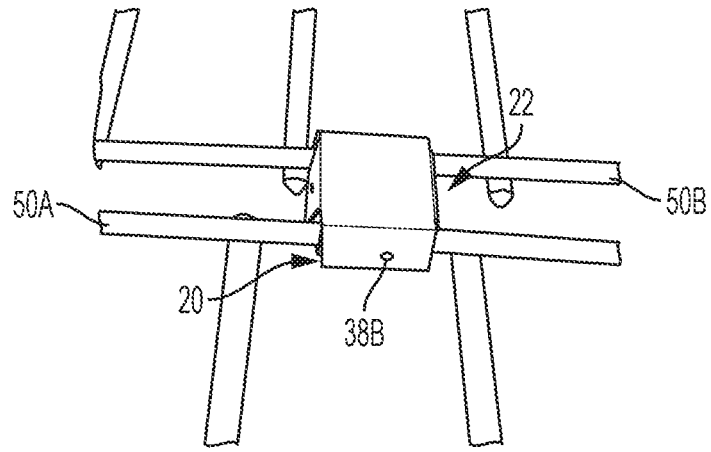
FIG. 11 is a top perspective view of FIG. 10 with the second connector connected to the first connector.
Figure 12:
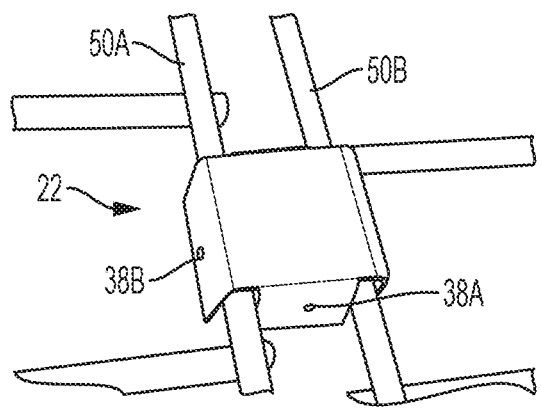
FIG. 12 is a top perspective view of FIG. 10 with the second connector connected to the first connector.

FIGS. 10-12 show the first and second connectors 20, 22 used to connect a first cable tray 50A and a second cable tray 50B. The first and second cable trays 50A, 50B are positioned near each other and one of the first connector 20 and the second connector 22 is positioned so that a wire of the first cable tray 50A is positioned extending between two openings 32, 42 between the tines and a wire of the second cable 50B tray is positioned between two opposite openings 32, 42. In this exemplary embodiment, the first and second wires are lateral wires and the cable trays 50A, 50B are placed at an end-to-end configuration. Alternative embodiments can engage different wires with the cable trays placed in different configurations. The other of the first and second connector 20, 22 is then placed to engage the already positioned connector, and the tines 26, 36 of the first and second connectors 20, 22 are compressed together with the first connecting feature 28A, 38A engaging the second connecting feature 28B, 38B. For example, the male and female connecting features of the respective connectors 20, 22 are mated. The first connector openings 32 align with the second connector openings 42 to form partially enclosed conduits that receive the wires from the first cable tray 50A and the second cable tray 50B. Compressing the first and second connectors 20, 22 together secures the two connectors 20, 22 and the first and second cable tray 50A, 50B. The first and second connectors 20, 22 can be crimped together with a standard tool, for example a pair of pump pliers—eliminating the need for specialty tools to be used in splicing together cable trays.

The foregoing detailed description of the certain exemplary embodiments has been provided for the purpose of explaining the principles of the disclosure and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:
1. A cable tray system comprising:
a first cable tray;
a second cable tray;
a first connector having a first base, a first tine extending from the first base having a first female connecting feature, and a second tine extending from the first base having a first male connecting feature, wherein the first tine and the second tine are separated by a first opening and wherein the first tine extends orthogonal to the second tine; and a second connector having a second base, a third tine extending from the second base having a second female connecting feature, and a fourth tine extending from the second base having a second male connecting feature, wherein the third tine and the fourth tine are separated by a second opening and wherein the third tine extends orthogonal to the fourth tine, wherein the first connector is connected to the second connector and a portion of the first cable tray and a portion of the second cable tray are positioned between the first connector and the second connector.

2. The cable tray system of claim 1, wherein the first female connecting feature mates with the second male connecting feature and the first male connecting feature mates with the second female connecting feature.

3. The cable tray system of claim 2, wherein the first, second, third, and fourth tines are deformable to connect the first and second connectors.

4. The cable tray system of claim 1, wherein the first and second openings at least partially define a conduit configured to receive the portion of the first cable tray.

5. The cable tray system of claim 1, wherein the fourth tine is positioned on the exterior of the first tine.

6. The cable tray system of claim 1, wherein the first male connecting feature includes a projection.

7. A cable tray system comprising:
a first cable tray;
a second cable tray;
a first connector having a first base, a first tine extending from the first base having a first female connecting feature, and a second tine extending from the first base having a first male connecting feature, wherein the first tine and the second tine are separated by a first opening and wherein the first tine extends orthogonal to the second tine; and
a second connector having a second base, a third tine extending from the second base having a second female connecting feature, and a fourth tine extending from the second base having a second male connecting feature, wherein the third tine and the fourth tine are separated by a second opening and wherein the third tine extends orthogonal to the fourth tine,
wherein the first male connecting feature includes a projection, and
wherein the first connector is connected to the second connector and a portion of the first cable tray and a portion of the second cable tray are positioned between the first connector and the second connector.

8. The cable tray system of claim 7, wherein the first female connecting feature includes a recess.

9. The cable tray splice of claim 7, wherein the first female connecting feature includes an opening.

10. The cable tray splice of claim 7, wherein the projection includes a dimple.

11. The cable tray system of claim 7, wherein the first female connecting feature mates with the second male connecting feature and the first male connecting feature mates with the second female connecting feature.

12. The cable tray system of claim 7, wherein the first, second, third, and fourth tines are deformable to connect the first and second connectors.

13. The cable tray system of claim 7, wherein the first and second openings at least partially define a conduit configured to receive the portion of the first cable tray.

14. A cable tray system comprising:
a first cable tray;
a second cable tray;
a first connector having a first base, a first tine extending from the first base having a first female connecting feature, and a second tine extending from the first base having a first male connecting feature, wherein the first connector defines a first opening and a second opening; and
a second connector having a second base, a third tine extending from the second base having a second female connecting feature, and a fourth tine extending from the second base having a second male connecting feature, wherein the second connector defines a third opening configured to align with the first opening and a fourth opening configured to align with the second opening,
wherein the first connector is connected to the second connector and a portion of the first cable tray is received in the first and third openings and a portion of the second cable tray is received in the second and fourth openings.

15. The cable tray system of claim 14, wherein the first and second cable trays are wire cable trays.

16. The cable tray system of claim 14, wherein the first and second cable trays are positioned end-to-end.

17. The cable tray system of claim 14, wherein the first connector and the second connector are crimped together.

18. The cable tray system of claim 14, wherein the first male connecting feature includes a projection.

19. The cable tray splice of claim 14, wherein the base has a rectilinear configuration and the first tine has a rectilinear configuration.

20. The cable tray splice of claim 14, wherein the first connector is identical to the second connector.

* * * * *